Jan. 15, 1952     E. E. FRANZ     2,582,690
BACKLASH ELIMINATING DEVICE
Filed May 6, 1949
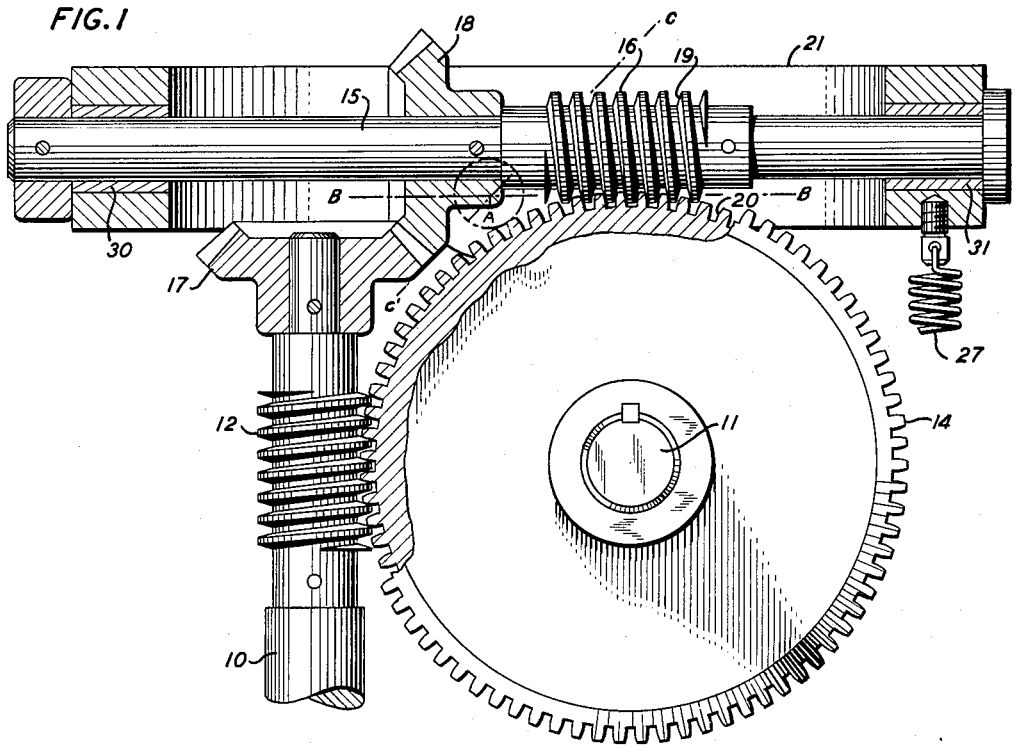
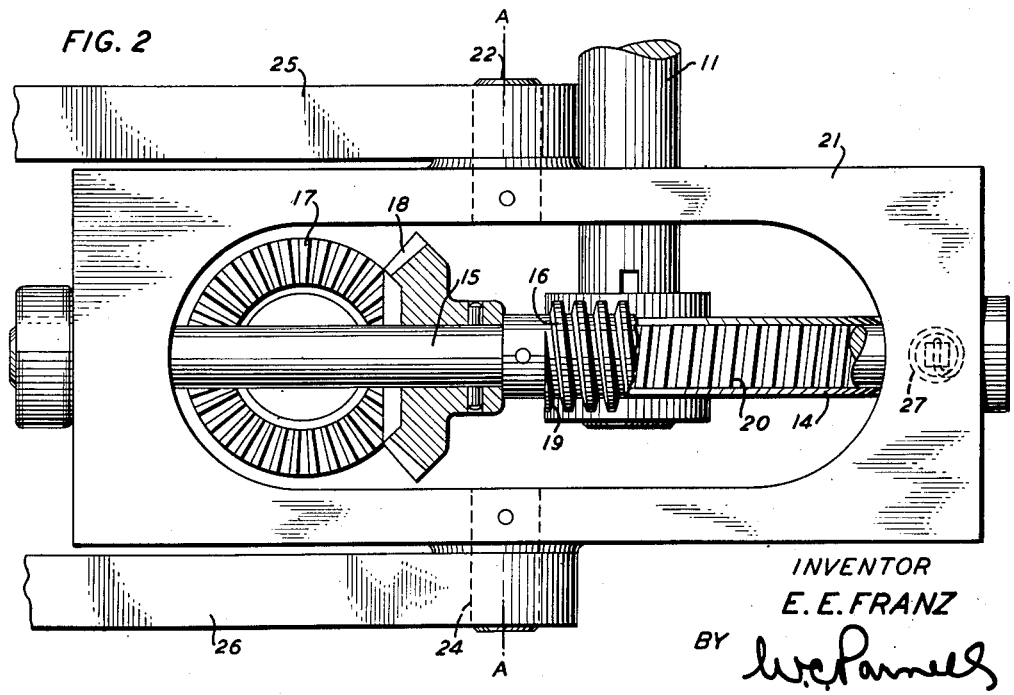
INVENTOR
E. E. FRANZ
BY
ATTORNEY Patented Jan. 15, 1952

2,582,690

UNITED STATES PATENT OFFICE 2,582,690

BACKLASH ELIMINATING DEVICE

Erwin E. Franz, Cranford, N. J., assignor to Western Electric Company, Incorporated, New York, N. Y., a corporation of New York Application May 6, 1949, Serial No. 91,743

4 Claims. (Cl. 74—427)

This invention relates to backlash-free gearing and more particularly to a backlash-free worm and wheel drive combination.

There are innumerable applications in many arts of worm and wheel gear driving combinations. Notably such combinations may be used in delicate adjusting devices in a great variety of applications and apparatus. Obviously, in such applications, absence of lost motion or backlash between the driving shaft and the driven shaft is an important consideration. Especially in connection with various apparatus and instruments developed in the last few years has adjustability of unprecedentedly accurate and reliable nature become necessary. In the prior art are many worm and wheel combinations with provisions to obviate lost motion or backlash; but as these generally depend, in one way or another, upon a slippable friction clutch or analogous friction device, overdriving an auxiliary member and slipping, these have not proved capable, in practice, of meeting the requirements since friction devices notoriously vary in effectiveness with changes in temperature and moisture conditions.

An object of the present invention is to provide a worm and wheel gear combination having reliably dependable means to obviate lost motion or backlash not dependent in any way upon frictional effect and thereby particularly adapted for use in adjustment devices of unusually delicate and accurate operability.

With the above and other objects in view, the invention may be illustratively embodied in two generally mutually perpendicular worms which engage the same gear wheel, with one worm being driven by the other. The driving worm has a fixed axis of rotation while the driven worm is tiltable about a pivot to become angularly movable toward and from the gear wheel, and is provided with resilient means to normally maintain it in close engagement with the gear wheel.

Other objects and features will appear from the following detailed description of an embodiment of the invention taken in connection with the accompanying drawing in which the same reference numerals are applied to identical parts in the several figures and in which:

Fig. 1 is a plan view, partly in section, of a worm and wheel drive embodying the invention; and Fig. 2 is an elevation of the showing of Fig. 1.

As herein disclosed the invention is applied in providing backlash-free driving connection between a drive shaft 10 and a driven shaft 11 spaced apart at right angles to each other and which are to be thought of as rotatably journalled in fixedly positioned bearings (not shown). The drive shaft 10 is formed or otherwise rigidly provided with a worm 12 meshing with a corresponding gear wheel 14 rigidly secured on the driven shaft 11. An auxiliary driven shaft 15 is located transversely across and spaced from the end of the shaft 10 as shown and bears a worm 16 whose teeth 19 engage with teeth 20 of the gear wheel 14. Bevel gears 17 and 18 are mounted respectively on the shafts 10 and 15 to enable the latter shaft to be driven by the former. The worms 12 and 16 are of identical pitch.

The shaft 15 is rotatably journalled at 30 and 31 in a cradle 21 which is pivotably supported on stub shafts 22 and 24, which are rigid with the cradle and are rotatably journalled in fixed supports 25 and 26. These parts are so proportioned and arranged that the shaft 15 is angularly tiltable with the cradle 21 toward and from the shaft 11 bringing the worm 16 thus more or less closely into meshing engagement with the wheel 14. Resilient means, such as the spring 27, are provided to resiliently enforce close meshing engagement of the worm 16 with the wheel 14.

With reference to the drawing it will be observed that the worm 12 is turning in a direction which causes it to engage the bottom surfaces of the teeth of gear wheel 14. Clearance spaces between the teeth of the driving worm 12 and those of the driven gear 14, which are also shown on the drawing, would allow backlash action to occur if no means were provided for its prevention. Such backlash action could come from any number of mechanical reasons connected with the driving mechanism, such as for example from the over-riding action caused by the weight of a cam driven by the shaft 11.

In the absence of means forcing the teeth 19 of the worm 16 into engagement with the corresponding teeth 20 of the gear wheel 14, the worm teeth would be rotated by the bevel gear driving connection between worm shafts 10 and 15 so as to stay ahead of and just clear the teeth of the gear wheel. When, as in the present invention, the worm shaft 15 is made tiltable about the pivoted axis 22 and 24, and the worm 16 urged into engagement with the gear wheel 14 by means of the spring 27 or other suitable resilient means, there results a close meshing engagement between the teeth 19 and the gear wheel teeth 20, with the former engaging the sides of the gear wheel teeth opposite to those sides normally engaged by the teeth of the worm 12. This action holds the wheel 14 in fixed relation to the worms 12 and 16 so that it is prevented from turning in its driven direction faster than the worm 12 drives it, thus preventing backlash or any lost motion from taking place.

The teeth 19 of the worm 16 are cut shorter than the teeth of worm 12 in order to prevent any possibility of the teeth 19 bottoming at the base of the teeth 20 of the gear wheel 14 before they have come into engagement with the sides of the latter teeth. If the worm teeth were to bottom before making engagement, they would be unable to prevent backlash from taking place.

The means provided for urging the worm 16 into close engagement with the wheel 14 are of the resilient type, such as the spring 27 shown in the drawing. The use of resilient means takes care of any irregularities in the engaging gear teeth, such as differences in tooth thickness or in center to center dimensions, and also insures that the teeth will be evenly loaded.

In locating the stub shafts 22 and 24 about which the worm 16 is pivoted, it is highly desirable that the common axis A—A of these shafts be along the pitch line B—B of the engaging teeth of the worm 16, and preferably where this pitch line intersects the base pitch line C—C of the bevel gears 17 and 18, as shown on the drawing. This would cause the worm teeth 19 to be tilted along their normal line of contact, and would avoid the turning moment which would be present if the axes were not located on this pitch line, and would also obviate the need for a larger size spring to overcome the turning moment so introduced. Any change in the loading of the bevel gears 17 and 18 resulting from the tilting of the worm shaft 15 on its rotatable axis would be an inconsequential factor, and would not interfere with the function of the worm 16 in preventing backlash between the worm 12 and the driven gear wheel 14.

Where the elimination of backlash is essential to the performance of a given mechanical gear drive, applicant's invention affords a simple way of accomplishing this purpose. The invention is not limited to a specific use, but is of general application in any type of gear mechanism requiring backlash elimination.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a gear mechanism, the combination with a driving worm and a gear driven by the worm, of a second worm meshing with the gear, means enabling the second worm to be driven by the first worm, a pivoted support for the second worm, and a spring acting relatively between the pivoted support and the gear which turns the second worm about the axis of its pivoted support and thereby urges the second worm into contact with the sides of the gear teeth opposite to the sides normally engaged by the first worm.

2. In a device for eliminating backlash, the combination with a driving shaft having a worm, a driven shaft and a gear mounted on the driven shaft which meshes with the driving worm, of a second driven shaft having a second worm which also meshes with the driven gear, coacting identical bevel gears mounted on the worm shafts to provide a driving connection therebetween, a pivoted support for the second worm, and a spring acting relatively between the pivoted support and the gear which turns the second worm about the axis of its pivoted support and thereby urges the second worm into contact with the sides of the gear teeth opposite to the sides normally engaged by the first worm.

3. In a device for eliminating backlash, the combination with a driving shaft having a worm, a driven shaft, and a gear mounted on the driven shaft which meshes with the driving worm, of a second driven shaft having a second worm which also meshes with the driven gear, coacting identical bevel gears mounted on the worm shafts to provide a driving connection therebetween, and means normally urging the second worm into contact with the sides of the gear teeth opposite to the sides normally engaged by the first worm, said means including a cradle in which the second worm is mounted, a pivoted support for said cradle, and a spring connected to one end of the cradle to turn the second worm about the axis of its pivoted support.

4. In a device for eliminating backlash, the combination with a driving shaft having a worm, a driven shaft, and a gear mounted on the driven shaft which meshes with the driving worm, of a second driven shaft having a second worm which also meshes with the driven gear, coacting identical bevel gears mounted on the worm shafts to provide a driving connection therebetween, and means normally urging the second worm into contact with the sides of the gear teeth opposite to the sides normally engaged by the first worm, said means including a cradle in which the second worm is mounted, a pivoted support for said cradle, the pivotal axis being located at the intersection of the pitch line of the engaging teeth of the second worm with the pitch line of the bevel gears, and a spring connected to one end of the cradle to turn the second worm about its pivotal axis.

ERWIN E. FRANZ.

REFERENCES CITED

The following references are of record in the file of this patent:

UNITED STATES PATENTS

| Number | Name | Date |
|---|---|---|
| 293,215 | Baar | Feb. 12, 1884 |
| 1,274,918 | Maag | Aug. 6, 1918 |
| 1,336,286 | Dorffel | Apr. 6, 1920 |
| 1,472,848 | Maag | Nov. 6, 1923 |
| 1,981,687 | Carter | Nov. 20, 1934 |
| 2,176,956 | Cook et al. | Oct. 24, 1939 |
| 2,348,392 | Kester | May 9, 1944 |